(12) United States Patent
Toeda et al.

(10) Patent No.: US 11,546,798 B2
(45) Date of Patent: Jan. 3, 2023

(54) NETWORK NODE

(71) Applicant: NTT DOCOMO, INC., Tokyo (JP)

(72) Inventors: Teruaki Toeda, Tokyo (JP); Tooru Uchino, Tokyo (JP); Hiroshi Ou, Tokyo (JP); Makoto Miyagoshi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/052,269

(22) PCT Filed: May 17, 2018

(86) PCT No.: PCT/JP2018/019206
§ 371 (c)(1),
(2) Date: Nov. 2, 2020

(87) PCT Pub. No.: WO2019/220606
PCT Pub. Date: Nov. 21, 2019

(65) Prior Publication Data
US 2021/0144585 A1 May 13, 2021

(51) Int. Cl.
*H04W 28/06* (2009.01)
(52) U.S. Cl.
CPC ................... *H04W 28/06* (2013.01)
(58) Field of Classification Search
CPC ........ H04L 47/00; H04L 47/34; H04W 28/06; H04W 28/08
See application file for complete search history.

(56) References Cited

U.S. PATENT DOCUMENTS

| | | | |
|---|---|---|---|
| 2015/0049678 A1* | 2/2015 | Speight | H04W 72/00 370/329 |
| 2015/0117286 A1* | 4/2015 | Kim | H04L 5/0032 370/311 |
| 2015/0146617 A1* | 5/2015 | Park | H04W 28/06 370/328 |
| 2017/0353883 A1* | 12/2017 | Tenny | H04W 28/0221 |
| 2018/0212716 A1* | 7/2018 | Sirotkin | H04L 1/203 |
| 2018/0262950 A1* | 9/2018 | Malkamäki | H04L 1/1621 |
| 2018/0368018 A1* | 12/2018 | Kim | H04W 72/1289 |
| 2019/0306871 A1* | 10/2019 | Liu | H04W 72/1263 |
| 2020/0221526 A1* | 7/2020 | Jin | H04W 76/19 |

(Continued)

OTHER PUBLICATIONS

International Search Report issued in PCT/JP2018/019206 dated Aug. 7, 2018 (5 pages).

(Continued)

*Primary Examiner* — Syed Ali
(74) *Attorney, Agent, or Firm* — Osha Bergman Watanabe & Burton LLP

(57) ABSTRACT

A network node in a wireless communication system comprising a user equipment and a plurality of network nodes, comprises: a reception unit for receiving from another network node or a user equipment a protocol data unit related to packet transmission that has a possibility of a plurality of data lengths with respect to sequence numbers; an acquiring unit for acquiring a sequence number of the protocol data unit related to packet transmission; and a notification unit for carrying out, based on the sequence number as acquired, notification related to packet transmission.

2 Claims, 9 Drawing Sheets

(56) References Cited

U.S. PATENT DOCUMENTS

2020/0235759 A1\* 7/2020 Ye ..................... H03M 13/1105
2021/0059008 A1\* 2/2021 Koskinen ............. H04W 76/36

OTHER PUBLICATIONS

Written Opinion of the International Searching Authority issued in PCT/JP2018/019206 dated Aug. 7, 2018 (5 pages).
Huawei, HiSilicon; "PDCP SN Reconfiguration"; 3GPP TSG-RAN WG2 Meeting #97bis, R2-1702587; Spokane, USA; Apr. 3-7, 2017 (6 pages).
MediaTek; "Configuration for PDCP SN extention"; 3GPP TSG-RAN WG2 Meeting #79, R2-123604; Qingdao, China; Aug. 13-17, 2012 (3 pages).
Qualcomm Incorporated; "Level of data forwarding in handover"; 3GPP TSG-RAN WG3 #96, R3-171794; Hangzhou, China; May 15-19, 2017 (4 pages).
3GPP TS 38.401 V15.1.0; "3rd Generation Partnership Project; Technical Specification Group Radio Access Network; NG-RAN; Architecture description (Release 15)" Mar. 2018 (23 pages).
3GPP TS 38.425 V15.1.0; "3rd Generation Partnership Project; Technical Specification Group Radio Access Network; NG-RAN; NR user plane protocol (Release 15)" Mar. 2018 (19 pages).
3GPP TS 36.425 V14.1.0; "3rd Generation Partnership Project; Technical Specification Group Radio Access Network; Evolved Universal Terrestrial Radio Access Network (E-UTRAN); X2 interface user plane protocol (Release 14)" Mar. 2018 (17 pages).
Extended European Search Report in counterpart European Application No. 18 91 9293.3 dated Dec. 14, 2021 (8 pages).
NEC; "X2 basic mobility procedures for EN-DC"; 3GPP TSG-RAN WG3 #98, R3-174887; Reno, USA; Nov. 27-Dec. 1, 2017 (8 pages).

\* cited by examiner

NETWORK NODE

TECHNICAL FIELD

The present invention relates to a network node in a wireless communication system.

BACKGROUND ART

At the 3rd Generation Partnership Project (3GPP), a wireless communication method called 5G or New Radio (NR) (hereinafter, the wireless communication method will be referred to as "5G" or "NR") have been discussed in order to achieve a further increase in system capacity, a further increase in data transmission speed, and a further reduction in delay in a wireless segment. For 5G, a variety of wireless techniques have been discussed in order to meet a requirement of achieving a throughput of 10 Gbps or higher while reducing a delay in a wireless segment to be 1 ms or less.

Further, for NR, functional roles of a central unit (CU) and distributed units (DU) in a wireless network architecture has been under review (e.g., Non-Patent Document 1).

RELATED-ART DOCUMENTS

Non-Patent Documents

Non-Patent Document 1: 3GPP TS 38.401 V15.1.0 (2018-03)
Non-Patent Document 2: 3GPP TS 38.425 V15.1.0 (2018-03)
Non-Patent Document 3: 3GPP TS 36.425 V14.1.0 (2018-03)

SUMMARY OF THE INVENTION

Problem to be Solved by the Invention

In a NR or LTE wireless network architecture, a network node related to flow control of packets as defined in Non-Patent Document 2 or Non-Patent Document 3 requires the latest sequence number of delivered packets when reporting information on packet transmission. However, depending on the protocol stack configurations, the network node had difficulty in extracting the sequence number from the packets.

In view of the above, it is an object of the present invention to allow a network node to correctly carry out flow control of packets.

Means to Solve the Problem

According to the disclosed technique, there is provided a network node in a wireless communication system comprising a user equipment and a plurality of network nodes, the network node comprising: a reception unit configured to receive, from another network node or a user equipment, a protocol data unit related to packet transmission that has a possibility of a plurality of data lengths with respect to sequence number; an acquiring unit configured to acquire a sequence number of the protocol data unit related to packet transmission; and a notification unit configured to perform, based on the acquired sequence number, notification related to packet transmission.

Advantage of the Invention

According to the disclosed technique, the network node can correctly carry out flow control of packets.

MODE FOR CARRYING OUT THE INVENTION

Figure 1:
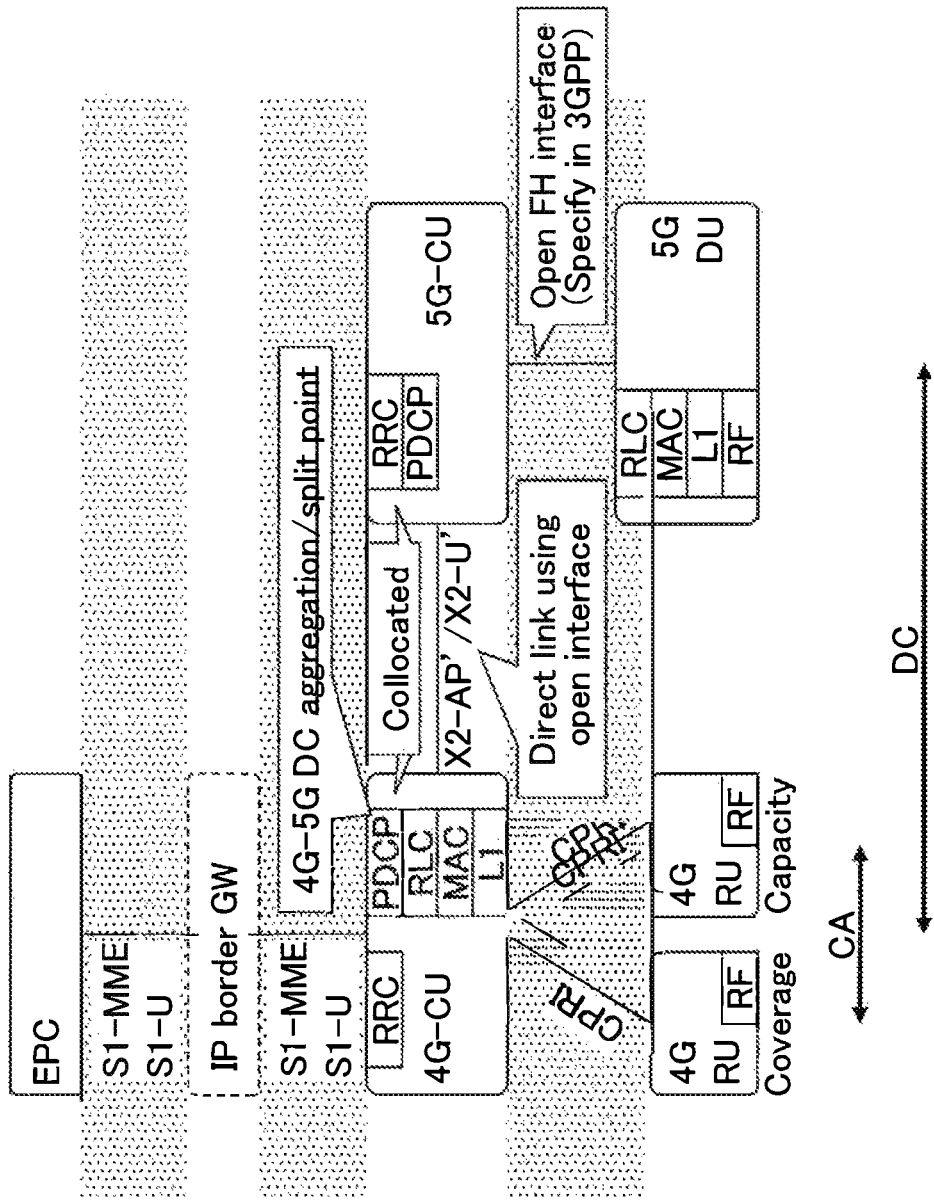
FIG. 1 is a diagram illustrating an exemplary configuration of a wireless network architecture in an embodiment of the present invention.

Hereinafter, embodiments of the present invention will be described with reference to the drawings. It should be noted that the embodiments described below are merely an example, and embodiments to which the present invention can be applied are not limited to the following embodiments.

For operations of a wireless communication system in the embodiments of the present invention, a preexisting technique may be used as appropriate. However, the preexisting technique may be, but is not limited to, preexisting LTE, for example. Unless otherwise specified, the term "LTE" as used herein should be construed as having a broad meaning including LTE-Advanced and methods after LTE-Advanced (e.g., NR or 5G).

Further, in the embodiments of the present invention described below, terms used in the preexisting LTE such as Synchronization Signal (SS), Primary SS (PSS), Secondary SS (SSS), Physical broadcast channel (PBCH), Physical RACH (PRACH), Downlink (DL), Uplink (UL) are used. However, these terms are used for the sake of convenience and different terms may be used to describe signals and functions similar to those mentioned above.

Further, in the embodiments of the present invention, a duplex system may be a time division duplex (TDD) system or a frequency division duplex (FDD) system or any other system (e.g., flexible duplex).

Further, in the following description, transmitting a signal using a transmission beam may be transmitting a signal multiplied by a precoding vector (pre-coded with a precoding vector). Similarly, receiving a signal using a reception beam may be multiplying a received signal with a predetermined weighted vector. Further, transmitting a signal using a transmission beam may be transmitting a signal with a specific antenna port. Similarly, receiving a signal using a reception beam may be receiving a signal with a specific antenna port. An antenna port refers to a logical antenna port or a physical antenna port specified in the 3GPP specifications.

Methods for forming transmission and reception beams are not limited to the above-mentioned methods. For example, when there are a base station equipment having a plurality of antennas and a user equipment, a method of changing the angle of each antenna may be used, a combination of a method of using a precoding vector and the method of changing antenna angles may be used, different antenna panels may be switched and used, a method of using a combination of a plurality of antenna panels may be used, or any other method may be used. Further, a plurality of different transmission beams may be used in a high frequency band. Using a plurality of transmission beams is referred to as a multi-beam operation and using one transmission beam is referred to as a single-beam operation.

Further, in the embodiments of the present invention, "configuring" wireless parameters and the like may be pre-configuring predetermined values or may be configuring wireless parameters reported from a base station equipment or a user equipment.

FIG. 1 is a diagram illustrating an exemplary configuration of a wireless communication system according to an embodiment of the present invention. As shown in FIG. 1, a wireless network architecture in the embodiment of the present invention comprises, on the LTE-Advanced side, a 4G-CU, 4G-Remote Units (RU, remote wireless station), Evolved Packet Core (EPC) and the like. The wireless network architecture in the embodiment of the present invention comprises, on the 5G side, a 5G-CU (hereinafter referred to as CU 100), a 5G-DU (hereinafter referred to as DU 200), and the like.

As shown in FIG. 1, 4G-CU comprises layers from a radio resource control (RRC) layer, a packet data convergence protocol (PDCP) layer, a radio link control (RLC) layer, a medium access control (MAC) layer to an L1 layer (layer 1, PHY layer or physical layer), and is connected to 4G-RUs through a common public radio interface (CPRI). A network node including 4G-CU and 4G-RUs will be referred to as eNB.

On the other hand, on the 5G side, as shown in FIG. 1, CU 100 comprises an RRC layer and is connected to DU 200 through a front haul (FH) interface. Further, CU 100 is connected to 4G-CU through an X2 interface. The PDCP layer in 4G-CU will be a linking or separation point when performing 4G-5G dual connectivity (DC), i.e., E-UTRA-NA dual connectivity (EN-DC). A network node including CU 100 and DU 200 will be referred to as gNB. Further, CU 100 may be referred to as gNB-CU, and DU 200 may be referred to as gNB-DU.

Further, as shown in FIG. 1, carrier aggregation (CA) is carried out between the 4G-RUs, and DC is performed between 4G-RUs and 5G-DU. Although not shown, a user equipment (UE) 300 is connected wirelessly through RF of 4G-RU and/or 5G-DU and sends and receives packets.

It should be noted that the wireless network architecture shown in FIG. 1 is at the time of LTE-NR DC. However, a similar wireless network architecture may be used when separating a 4G-CU with a CU-DU or adopting an NR standalone operation. When separating a 4G-CU into a CU and DU, the functions of the RRC and PDCP layers may be delegated to 4G-CU and layers of the RLC layer and below may be included in 4G-DU. A reduction in CPRI data rate caused by CU-DU separation may be permitted. Further a plurality of 5G-DUs may be connected to the 5G-CU.

Figure 2:
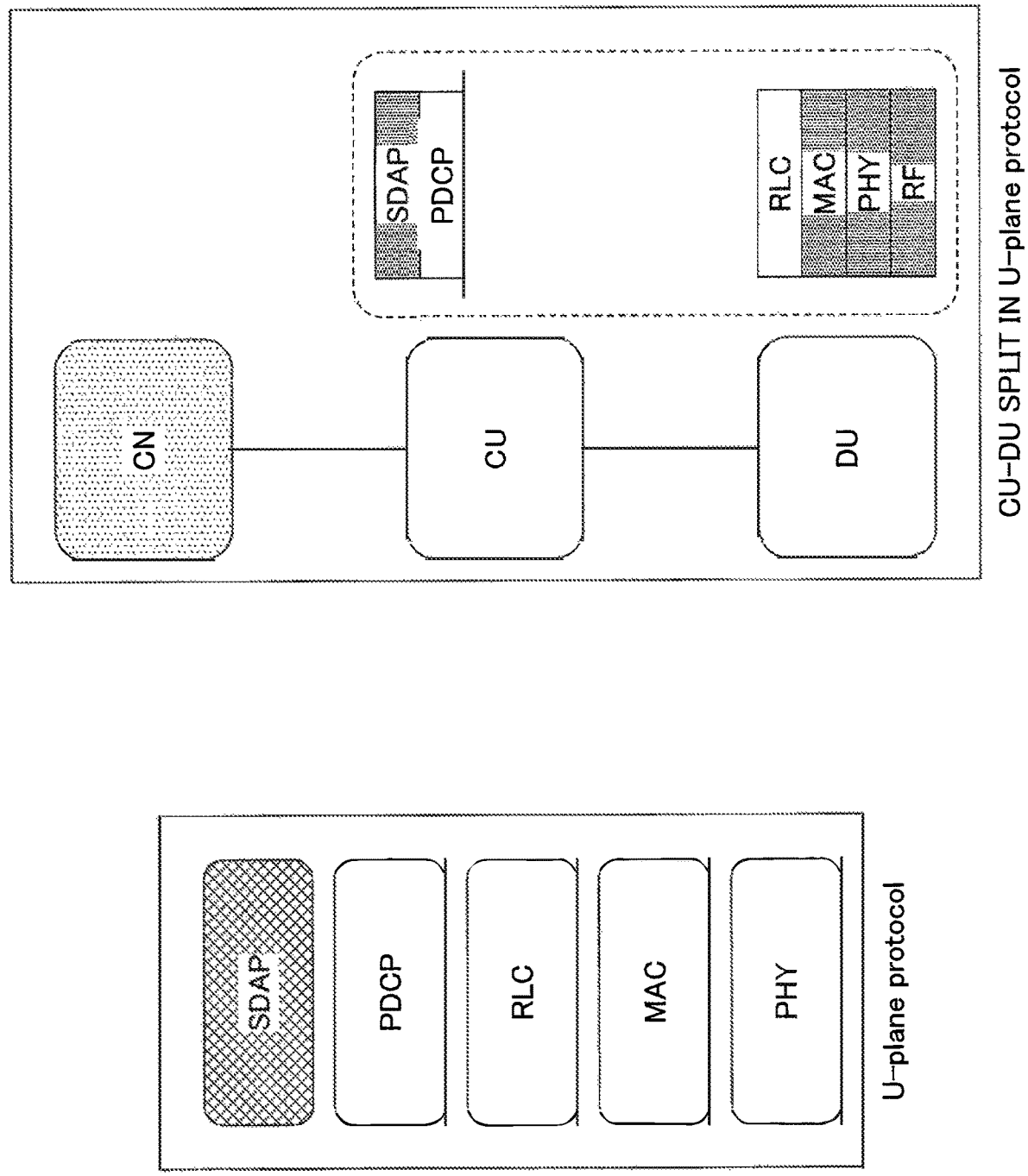
FIG. 2 is a diagram illustrating an exemplary configuration of a U-plane protocol stack in the embodiment of the present invention.

FIG. 2 is a diagram illustrating an exemplary configuration of a U-plane protocol stack in the embodiment of the present invention. With reference to FIG. 2, a U-plane protocol stack in NR and CU-DU separation will be described.

As shown in FIG. 2, the U-plane protocol stack is composed of, from the bottom to the top, a PHY layer, a MAC layer, an RLC layer, a PDCP layer, and a Service Data Adaptation Protocol (SDAP) layer. The SDAP layer is a layer that is applied in the case of a 5G core network and performs mapping of IP flow and a wireless bearer. When CU-DU separation is performed in NR, of the respective layers of the U-plane protocol stack, DU includes RF, the PHY layer, the MAC layer and the RLC layer, and CU includes the PDCP layer and the SDAP layer. CU is further connected to core network (CN). That is, as shown in FIG. 2, CU-DU separation is performed between the RLC layer and the PDCP layer.

Here, with regard to U-plane data transmission and reception in DL, a network node related to NR PDCP operations for flow control needs to extract a PDCP sequence number from packets. For example, it is necessary to extract the PDCP sequence number when reporting on the NR U-plane protocol the latest PDCP sequence number whose delivery was completed. However, a network node related to NR PDCP operations may have difficulties in extracting the PDCP sequence number from packets.

It should be noted that the NR U-plane protocol transmits control information on flow control of user data and is located on the U-plane of a wireless network layer through Xn interface, X2 interface or F1 interface. The Xn interface is an interface between CUs 100, between 4G-CUs, or between a 4G-CU and a CU 100 when 5GC is used as the core. The X2 interface is an interface between CU 100s, between 4G-CUs, or between a 4G-CU and a CU 100, when EPC is used as the core. The F1 interface is an interface between CU 100 and DU 200.

Figure 3:
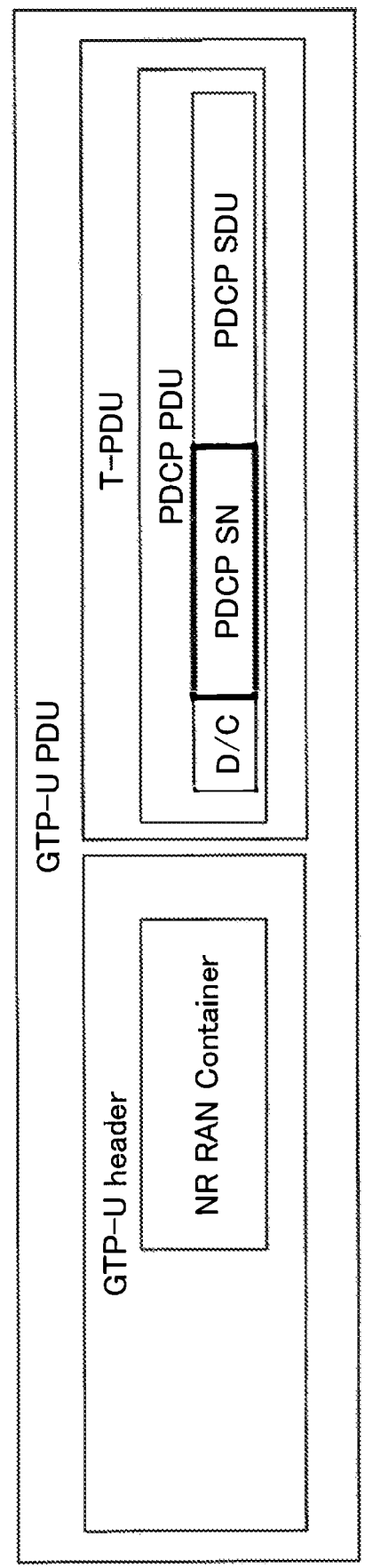
FIG. 3 is a diagram illustrating exemplary GTP-U protocol data unit (1) in the embodiment of the present invention.

FIG. 3 is a diagram illustrating an exemplary GTP-U protocol data unit (1) in the embodiment of the present invention. In FIG. 3, a message format of a GPRS tunneling protocol for a user plane (GTP-U) protocol data unit is shown. As shown in FIG. 3, the GTP-U protocol data unit comprises a GTP-U header and a transport PDU (T-PDU). The GTP-U header includes information indicating a NR RAN container. The T-PDU includes a PDCP protocol data unit. The PDCP protocol data unit comprises "D/C" that indicates whether the protocol data unit is a control PDU or a data PDU, "PDCP SN", i.e., a PDCP sequence number, and "PDCP SDU", i.e., a PDCP service data unit.

Except for at the time of data transfer for transferring not PDCP PDU but actual packets, explicit notification of the PDCP sequence number is not carried out on the GTP-U.

Thus, the network node related to NR PDCP operations needs to extract the PDCP sequence number from the packets.

However, to extract the PDCP sequence number from the packets, the network node related to NR PDCP operations needs to obtain information indicating the format of the PDCP protocol data unit including the data length with respect to the PDCP sequence number (e.g., 12 bits or 18 bits). The format of the PDCP protocol data unit is obtained by the network node as PDCP-Config.

On the other hand, PDCP-Config is not recognized by the network node related to the DU 200 or NR PDCP operations. Furthermore, in gNB, with respect to a secondary node that terminates a bearer, when transmitting cell group-config-Info, CU 100 adds no new configuration and forwards CG-ConfigInfo received from NB, a master node, as is. It should be noted that the network node related to the DU 200 or NR PDCP operations may be referred to as a "corresponding node".

Thus, as a first way to obtain a PDCP sequence number, a lower network node, i.e., the network node related to PDCP operations of DU 200 or NR extracts the PDCP sequence number from a PDCP protocol data unit by using any one of or a combination of the following methods. In the following methods 1), 2) and 3), a higher network node notifies a lower network node of PDCP-Config as information indicating the format of the PDCP protocol data unit.

1) The network node related to the DU 200 or NR PDCP operations obtains PDCP-Config through internode messages, and, based on the PDCP-Config, extracts the PDCP sequence number from the PDCP protocol data unit.

2) The network node related to the DU 200 or NR PDCP operations obtains PDCP-Config in advance through a maintenance plane (M-plane), and, based on the PDCP-Config, extracts the PDCP sequence number from the PDCP protocol data unit.

3) The network node related to the DU 200 or NR PDCP operations obtains PDCP-Config through Control plane (C-plane), and, based on the PDCP-Config, extracts the PDCP sequence number from the PDCP protocol data unit.

It should be noted that the M-plane is a management plane that transmits to network nodes information on operation and maintenance (OAM). Further, notification of PDCP-Config to the network node through the C-plane may be carried out by X2 interface, Xn interface or F1 interface signaling.

In the items 1), 2) and 3) described above, the network node may be notified of PDCP-Config through CN or UE. Further, in the items 1), 2) and 3) described above, notification of PDCP-Config may be carried out per PDCP protocol data unit.

In the items 1), 2) and 3) described above, in place of the format of the PDCP protocol data unit notification of the PDCP sequence number length or other information indicating the PDCP sequence number length may be carried out.

As a second way to obtain the PDCP sequence number, the lower network node, i.e., the network node related to the DU 200 or NR PDCP operations, may extract a PDCP sequence number apart from the PDCP protocol data unit by using any one of or a combination of the following methods. In the following methods 4) and 5), the lower network node can obtain the PDCP sequence number without obtaining the format of the PDCP protocol data unit. As will be described below, notification of the PDCP sequence number is performed (carried out) with a protocol other than PDCP.

4) Carrying out notification of the PDCP sequence number expressly on the NR user plane (NR user plane)

5) Carrying out notification of the PDCP sequence number expressly on GTP-U

Figure 4:
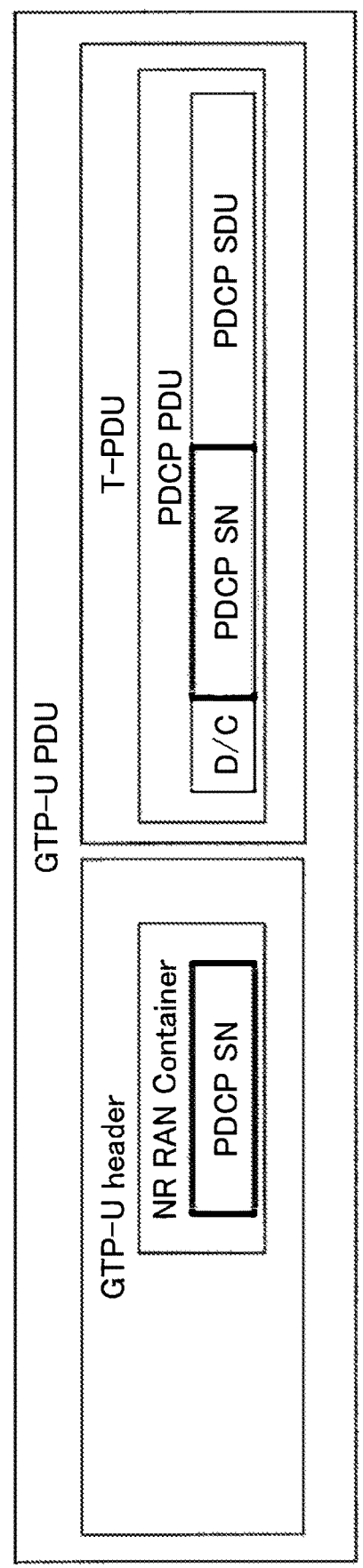
FIG. 4 is a diagram illustrating exemplary GTP-U protocol data unit (2) in the embodiment of the present invention.

FIG. 4 is a diagram illustrating exemplary GTP-U protocol data unit (2) in the embodiment of the present invention. FIG. 4 shows a GTP-U protocol data unit when carrying out notification of the PDCP sequence number expressly on the NR user plane as in the item 4) above. Notification of the PDCP sequence number is carried out on the NR-U protocol data unit contained in the GTP-U header.

Figure 5:
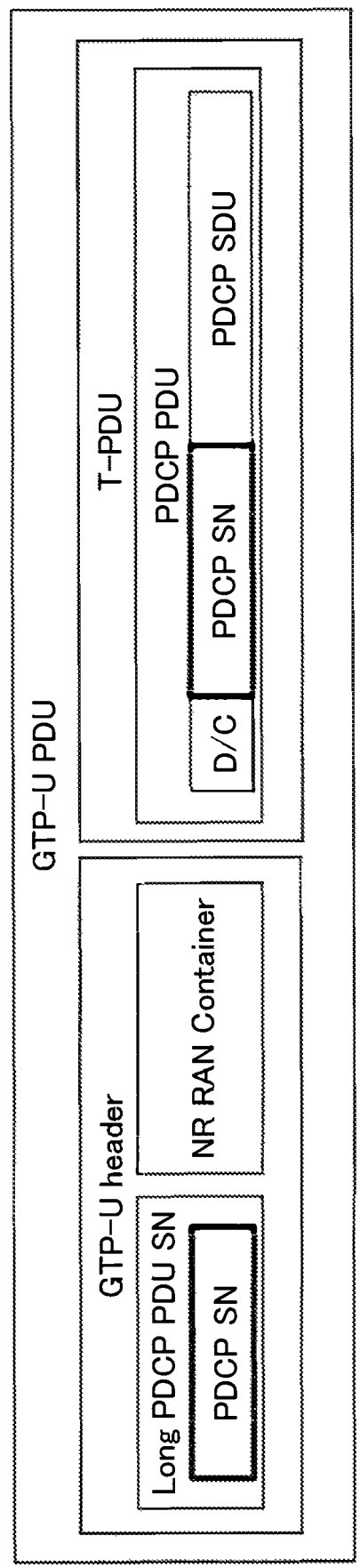
FIG. 5 is a diagram illustrating exemplary GTP-U protocol data unit (3) in the embodiment of the present invention.

FIG. 5 is a diagram illustrating exemplary GTP-U protocol data unit (3) in the embodiment of the present invention. FIG. 5 shows a GTP-U protocol data unit when carrying out notification of the PDCP sequence number expressly on GTP-U as in the item 5) above. Notification of "PDCP sequence number" is carried out using "Long PDCP PDU Number" as a GTP-U extension header included in the GTP-U header. Although a case where the "Long PDCP PDU Number" is used is explained, the notification may be carried out using "PDCP PDU Number".

It should be noted that in the items 4) and 5) described above, when the PDCP protocol data unit includes no PDCP sequence number, for example, when the PDCP protocol data unit is a PDCP control PDU, any of or a combination of the following may be implemented to achieve the process: not including the PDCP sequence number, indicating that the protocol data unit is a PDCP control PDU, and setting as the PDCP sequence number a predetermined value, i.e., a null value or "out-of-range". In the case of UL data transfer, the PDCP sequence number may not be given. Further, in the items 4) and 5) above, a case where GTP-U protocol and NR-U protocol are used is described as an example. However, notification of the PDCP sequence number may be carried out expressly by using other protocols.

It should be noted that the methods described in connection with the items 1), 2), 3), 4) and 5) above may be used in combination. For example, when the lower network node detects that the method related to the item 4) or 5) is not used for transfer data, the method related to the item 1), 2) or 3) may be used to extract the PDCP sequence number from the PDCP protocol data unit.

It should be noted that the methods related to the items 1), 2), 3), 4) and 5) described above may be applied per bearer, per RLC channel, per RLC bearer, per network node related to PDCP operations of NR, per DU 200, and the like.

Figure 6:
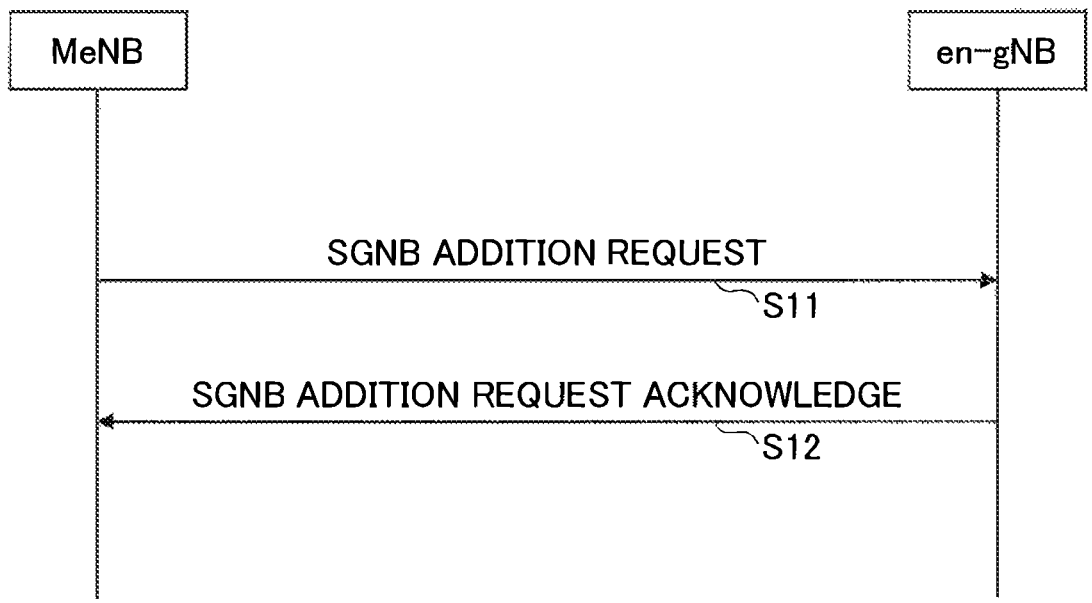
FIG. 6 is a sequential diagram for illustrating exemplary internode messages (1) in the embodiment of the present invention.

FIG. 6 is a sequential diagram for illustrating exemplary internode messages (1) in the embodiment of the present invention. With reference to FIG. 6, a notification method of information on PDCP-Config through C-plane by using internode messages "SGNB ADDITION REQUEST" and "SGNB ADDITION REQUEST ACKNOWLEDGE" that are exchanged between a master eNB (MeNB) and a secondary gNB (en-gNB) in EN-DC will be described. It should be noted that en-gNB refers to a network node as a secondary node in EN-DC that terminates NR user plane and NR control plane protocol with respect to UE 300.

The internode messages "SGNB ADDITION REQUEST" and "SGNB ADDITION REEQUEST ACKNOWLEDGE" are used when MeNB requests en-gNB to allocate a resource for UE 300. At step S11, MeNB sends "SGNB ADDITION REQUEST" to en-gNB, and at step S12, en-gNB sends "SGNB ADDITION REQUEST ACKNOWLEDGE" to MeNB.

When notifying the network node of the PDCP-Config through C-Plane as in the item 3) above, the internode messages "SGNB ADDITION REQUEST" and "SGNB ADDITION REQUEST ACKNOWLEDGE" may include information indicating a PDCP sequence number length. The information indicating a PDCP sequence number length may indicate that the information element "DL PDCP SN Size" is of the ENUM type (len 12 bits, len 18 bits, . . . ).

Figure 7:
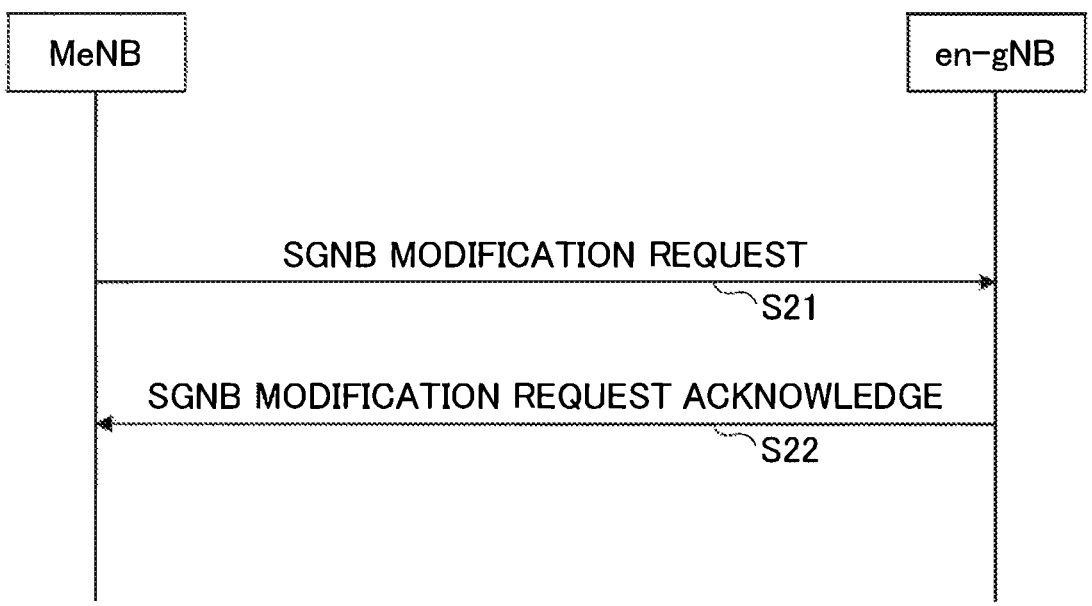
FIG. 7 is a sequential diagram for illustrating exemplary internode messages (2) in the embodiment of the present invention.

FIG. 7 is a sequential diagram for illustrating exemplary internode messages (2) in the embodiment of the present invention. With reference to FIG. 7, a notification method of information on PDCP-Config through C-plane by using internode messages "SGNB MODIFICATION REQUEST" and "SGNB MODIFICATION REQUEST ACKNOWLEDGE" that are exchanged between MeNB and secondary gNB in EN-DC will be described.

The internode messages "SGNB MODIFICATION REQUEST" and "SGNB MODIFICATION REQUEST ACKNOWLEDGE" are used when MeNB asks en-gNB to change UE context, inquires about configurations of a current secondary group or supplies information on radio link failure (RLF) to en-gNB. At step S21, MeNB sends "SGNB MODIFICATION REQUEST" to en-gNB, and at step S22, en-gNB sends "SGNB MODIFICATION REQUEST ACKNOWLEDGE" to MeNB.

When notifying the network node of PDCP-Config through C-Plane as in the item 3) above, the internode message "SGNB MODIFICATION REQUEST" may include information indicating a PDCP sequence number length. The information indicating a PDCP sequence number length may indicate that the information element "DL PDCP SN Size" is of the ENUM type (len 12 bits, len 18 bits, . . . ).

Figure 8:
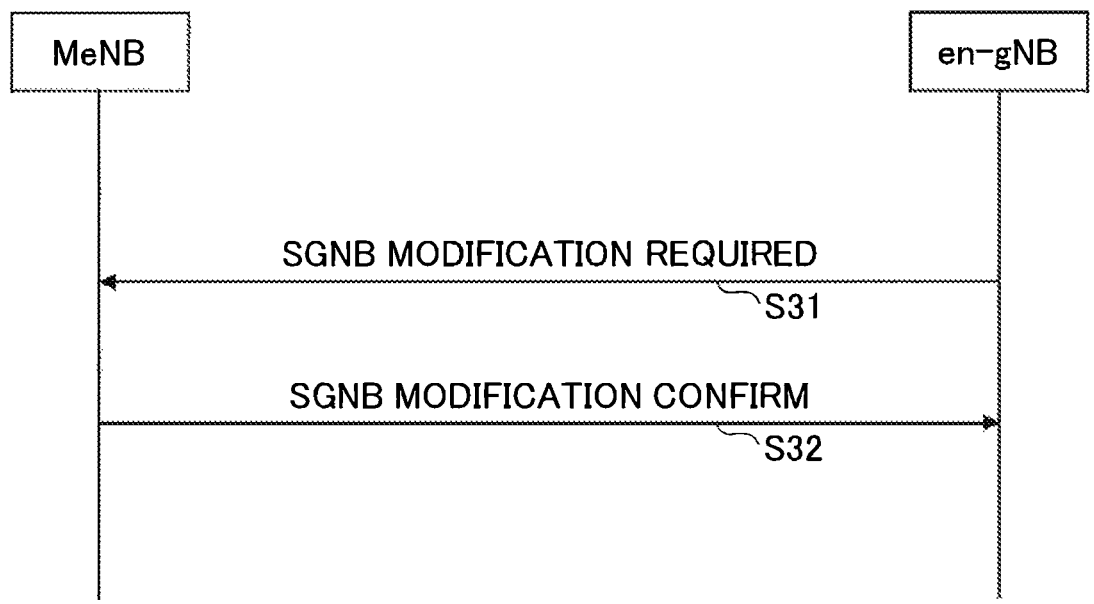
FIG. 8 is a sequential diagram for illustrating exemplary internode messages (3) in the embodiment of the present invention.

FIG. 8 is a sequential diagram for illustrating exemplary internode messages (3) in the embodiment of the present invention. With reference to FIG. 8, a notification method of information on PDCP-Config through C-plane by using internode messages "SGNB MODIFICATION REQUIRED" and "SGNB MODIFICATION CONFIRM" that are exchanged between MeNB and en-gNB in EN-DC will be described.

The internode messages "SGNB MODIFICATION REQUIRED" and "SGNB MODIFICATION CONFIRM" are used when en-gNB requests MeNB to change UE context. At step S31, en-gNB sends "SGNB MODIFICATION REQUIRED" to MeNB, and at step S32, MeNB sends "SGNB MODIFICATION CONFIRM" to en-NB.

When notifying the network node of PDCP-Config through C-Plane as in the item 3) above, the internode message "SGNB MODIFICATION REQUIRED" may include information indicating a PDCP sequence number length. The information indicating a PDCP sequence number length may indicate that the information element "DL PDCP SN Size" is of the ENUM type (len 12 bits, len 18 bits, . . . ).

As in the examples described above, the network node can extract the PDCP sequence number from packets due to information on PDCP-Config being signaled, and by obtaining the latest PDCP sequence number, the network node can report information on transmission of packets. Further, as the PDCP sequence number is signaled expressly, the network node can obtain the latest PDCP sequence number of the delivered packets and report information on transmission of packets.

In other words, the network node can carry out flow control of packets correctly.

(Device Configuration)

Next, exemplary functional configurations of CU 100, DU 200 and UE 300 that perform the explained processes and operations will be described. CU 100, DU 200 and UE 300 each include at least functions for implementing the examples. However, CU 100, DU 200 and UE 300 may each have only part of the functions in the examples.

Figure 9:
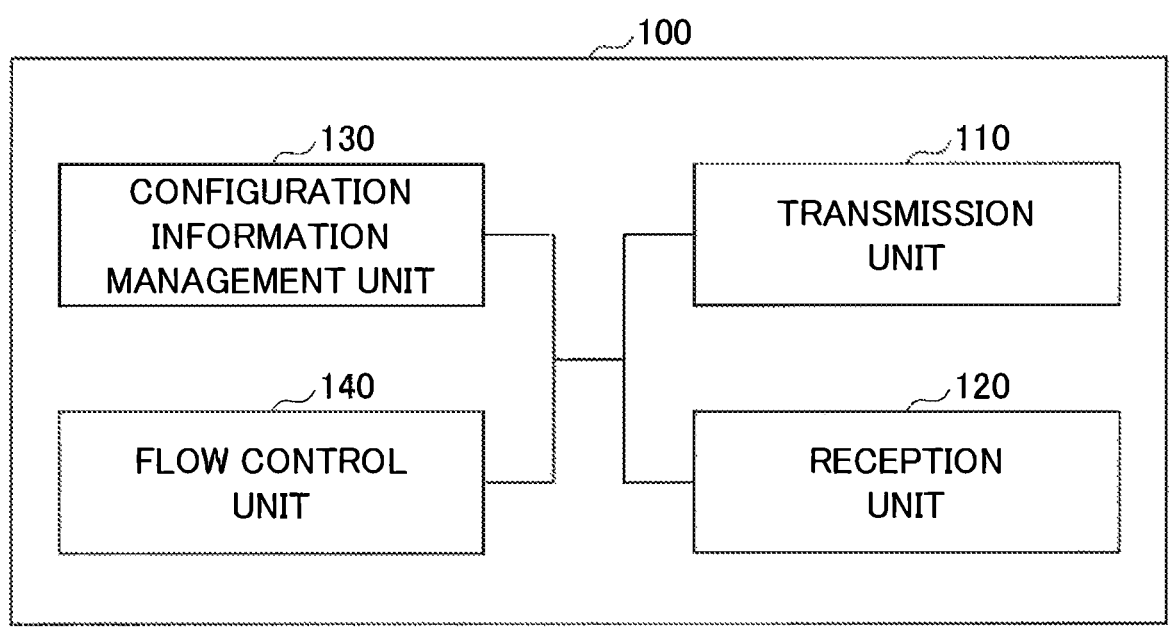
FIG. 9 is a diagram illustrating an exemplary functional configuration of CU 100 in the embodiment of the present invention.

FIG. 9 is a diagram illustrating an exemplary functional configuration of CU 100. As shown in FIG. 9, CU 100 has a transmission unit 110, a reception unit 120, a configuration information management unit 130 and a flow control unit 140. The functional configuration shown in FIG. 9 is merely an example. Any functional division or any name may be used as long as the operations according to the embodiment of the present invention can be performed.

The transmission unit 110 includes a function of generating a signal to be sent to DU 200, other CU 100 or other network node and sending the signal. The reception unit 120 includes a function of receiving a variety of signals sent from DU 200, other CU 100 or other network node and obtaining from the received signals, for example, information on higher layers.

The configuration information management unit 130 stores pre-configured configuration information se. The contents of the setting information include layer information, and information on a layer stack, for example.

As described in the examples, the flow control unit 140 performs flow control of packets and sends to DU 200 information on packet conditions.

Figure 10:
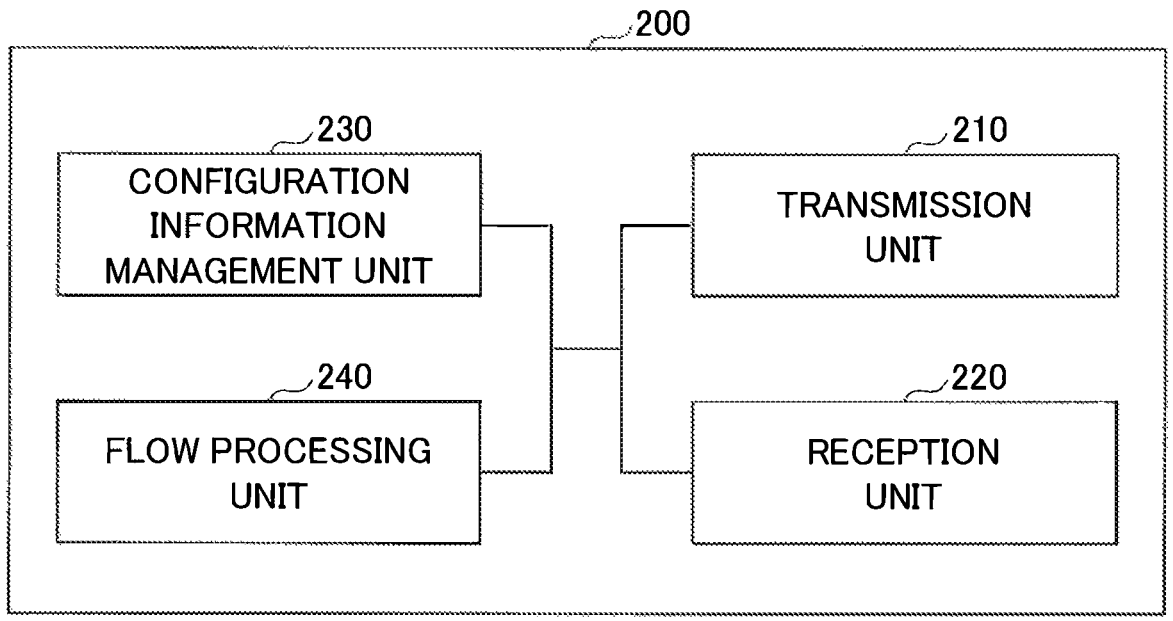
FIG. 10 is a diagram illustrating an exemplary functional configuration of DU 200 in the embodiment of the present invention.

FIG. 10 is a diagram illustrating an exemplary functional configuration of DU 200. As shown in FIG. 10, DU 200 has a transmission unit 210, a reception unit 220, a configuration information management unit 230 and a flow processing unit 240. The functional configuration shown in FIG. 10 is merely an example. Any functional division or any name may be used as long as the operations according to the embodiment of the present invention can be performed.

The transmission unit 210 includes a function of generating a signal to be sent to UE 300 and sending the signal wirelessly. Further, the transmission unit 210 has a function of sending a signal to CU 100. The reception unit 220 includes a function of receiving a variety of signals sent from UE 300 and obtaining from the received signals, for example, information on higher layers.

The configuration information management unit 230 stores pre-configured configuration information and various pieces of configuration information to be sent to CU 100 or UE 300. The contents of the configuration information include layer information, and information on a layer stack, for example.

As described in the examples, the flow processing unit 240 performs flow control of packets and sends or receives information on packet conditions.

Figure 11:
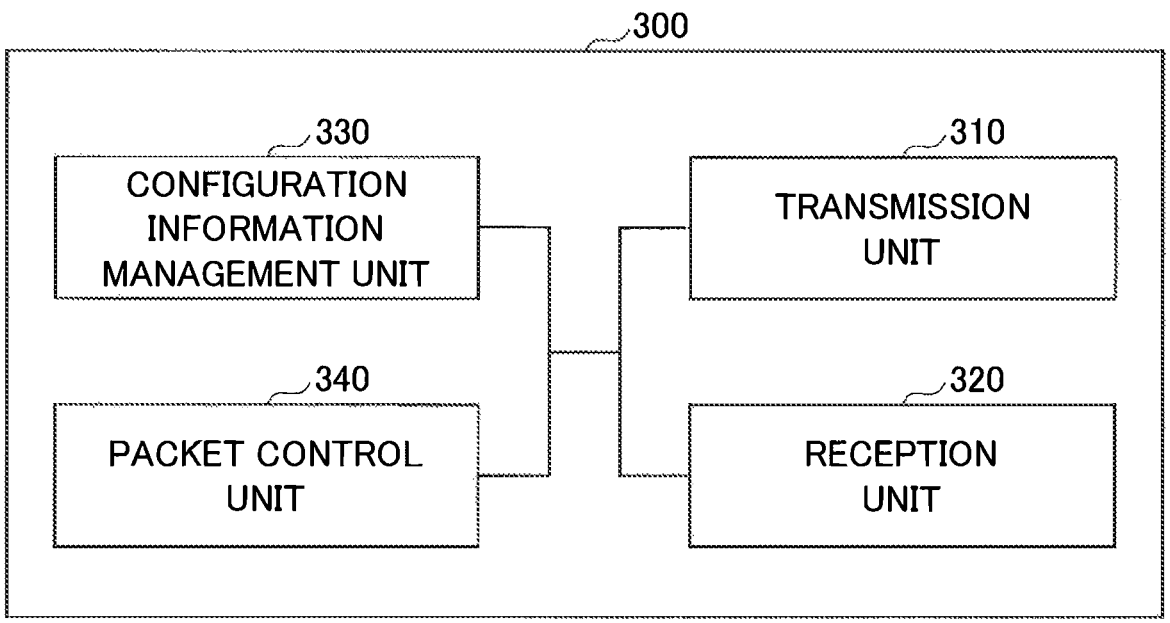
FIG. 11 is a diagram illustrating an exemplary functional configuration of UE 100 in the embodiment of the present invention.

FIG. 11 is a diagram illustrating an exemplary functional configuration of UE 300. As shown in FIG. 11, UE 300 has a transmission unit 310, a reception unit 320, a configuration information management unit 330 and a packet control unit 340. The functional configuration shown in FIG. 11 is merely an example. Any functional division or any name may be used as long as the operations according to the embodiment of the present invention can be performed.

The transmission unit 310 creates a transmission signal from transmission data and sends the transmission signal to DU 200 wirelessly. The reception unit 320 receives a variety of signals from DU 200 wirelessly, and obtains from the received physical layer signal, for example, information on higher layers. Further, the reception unit 320 receives an annunciation signal, control information or data from DU 200. The configuration information management unit 330 stores various pieces of configuration information received from DU 200 through the reception unit 320. Further, the configuration information management unit 330 also stores pre-configured configuration information. The contents of the configuration information include information on various capabilities of UE 300.

As described in the examples, the packet control unit 340 controls transmission and reception of packets to and from DU 200. A functional portion of the packet control unit 340 for sending a control signal or data may be included in the transmission unit 310. A functional portion of the packet control unit 340 for receiving a control signal or data may be included in the reception unit 320.

<Hardware Configuration>

In the functional configuration diagrams (FIGS. 9, 10, and 11) used in the description of the above embodiment, the blocks of the functional units are illustrated. The functional blocks (configuring units) are implemented by any combination of hardware and/or software. A device of implementing each functional block is not particularly limited. In other words, each functional block may be implemented by one device which is physically and/or logically combined or may be implemented by a plurality of devices, that is, two or more devices which are physically and/or logically separated and are directly and/or indirectly connected (for example, a wired and/or wireless manner).

Figure 12:
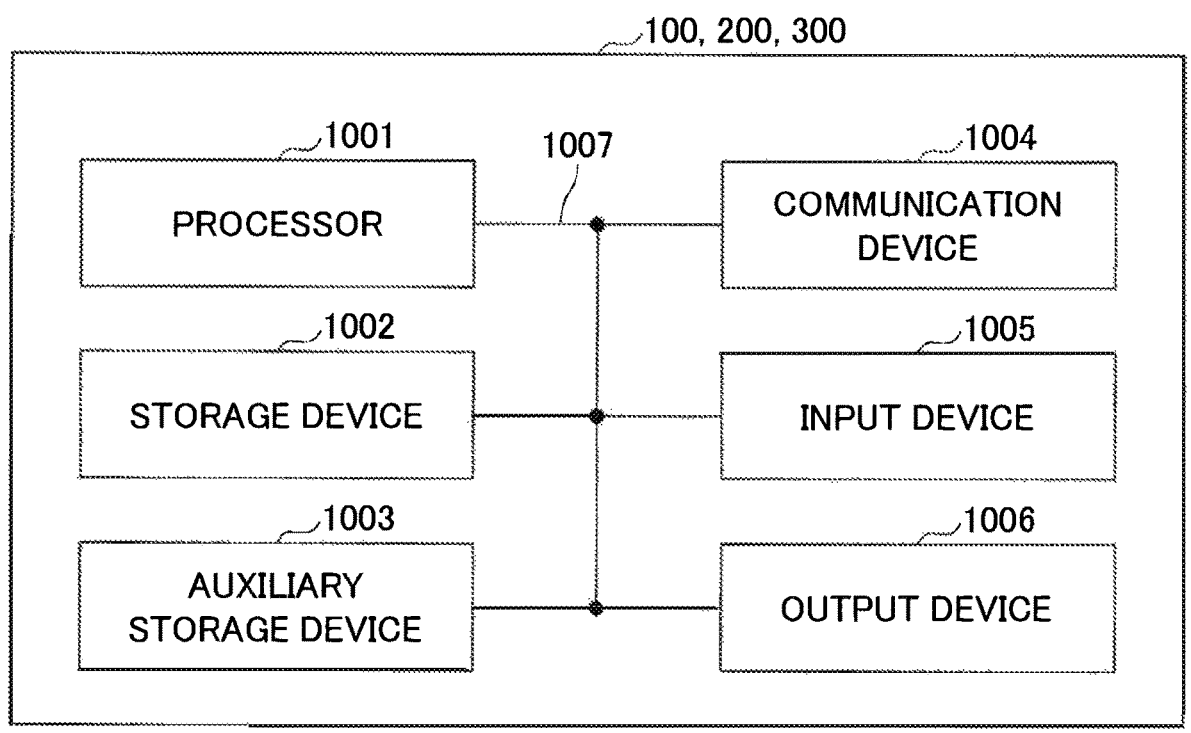
FIG. 12 is a diagram showing an exemplary hardware configuration of CU 100, DU 200 or UE 300 in the embodiment of the present invention.

For example, each of CU 100, DU 200 and UE 300 in the embodiment of the present invention may function as a computer that performs the process according to the embodiment of the present invention. FIG. 12 is a diagram illustrating an example of a hardware configuration of a communication device as CU 100, DU 200 or UE 300 according to one embodiment of the present invention. Each of CU 100, DU 200 and UE 300 described above may be physically configured as a computer device that includes a processor 1001, a storage device 1002, an auxiliary storage device 1003, a communication device 1004, an input device 1005, an output device 1006, a bus 1007, and the like.

In the following description, the term "device" can be replaced with a circuit, a device, a unit, or the like. The hardware configuration of each of CU 100, DU 200 and UE 300 may be configured to include one or more devices denoted by 1001 to 1006 illustrated in the drawing or may be configured without including some devices.

Each function in each of CU 100, DU 200 and UE 300 is implemented such that predetermined software (program) is read on hardware such as the processor 1001 and the storage device 1002, and the processor 1001 performs an operation and controls communication by the communication device 1004 and reading and/or writing of data in the storage device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like.

Further, the processor 1001 reads a program (a program code), a software module, and data from the auxiliary storage device 1003 and/or the communication device 1004 out to the storage device 1002, and performs various kinds of processes according to them. A program causing a computer to execute at least some of the operations described in the above embodiment is used as the program. For example, the transmission unit 110, the reception unit 120, the configuration management unit 130, and the flow control unit 140 of CU 100 shown in FIG. 9, for example, may be implemented by a control program which is stored in the storage device 1002 and operates on the processor 1001. Further, the transmission unit 210, the reception unit 220, the configuration management unit 230, and the flow control unit 240 of DU 200 shown in FIG. 10, for example, may be implemented by a control program which is stored in the storage device 1002 and operates on the processor 1001. Further, the transmission unit 310, the reception unit 320, the configuration management unit 330, and the packet control unit 340 of UE 300 shown in FIG. 11, for example, may be implemented by a control program which is stored in the storage device 1002 and operates on the processor 1001. Various types of processes are described as being performed by one processor 1001 but may be performed simultaneously or sequentially by two or more processors 1001. The processor 1001 may be implemented by one or more chips. The program may be transmitted from a network via an electric communication line.

The storage device 1002 is a computer readable recording medium and configured with at least one of a read only memory (ROM), an erasable programmable ROM (EPROM), an electrically erasable programmable ROM (EEPROM), a random access memory (RAM), etc. The storage device 1002 is also referred to as a "register," a "cache," a "main memory," or the like. The storage device 1002 can store programs (program codes), software modules, or the like which are executable for carrying out the process according to an embodiment of the present embodiment.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The auxiliary storage device 1003 is also referred to as an "auxiliary storage device." The storage medium may be, for example, a database, a server, or any other appropriate medium including the storage device 1002 and/or the auxiliary storage device 1003.

The communication device 1004 is hardware (a transmitting and receiving device) for performing communication between computers via a wired and/or wireless network and is also referred to as a network device, a network controller, a network card, a communication module, or the like. For example, the transmission unit 110 and the reception unit 120 of CU 100 may be implemented by the communication device 1004. Further, the transmission unit 210 and the reception unit 220 of DU 200 may be implemented by the communication device 1004. The transmission unit 310 and the reception unit 320 of UE 300 may be implemented by the communication device 1004.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrated (for example, a touch panel).

The devices, such as the processor 1001 and the storage device 1002, may be connected via the bus 1007 to communicate information with each other. The bus 1007 may be configured with a single bus or may be configured with different buses between the devices.

Further, each of CU 100, DU 200 and UE 300 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these hardware components.

(Summary of Embodiment)

As described above, according to the embodiment of the present invention there is provided a network node in a wireless communication system comprising a user equipment and a plurality of network nodes, the network node comprising: a reception unit for receiving from another network node or a user equipment a protocol data unit related to packet transmission that has a possibility of a plurality of data lengths with respect to sequence numbers; an acquiring unit for acquiring a sequence number of the protocol data unit related to packet transmission; and a notification unit for carrying out, based on the sequence number as acquired, notification related to packet transmission.

As a result of having the above configuration, the network node can report information on packet transmission by obtaining a PDCP sequence number of packets to obtain the latest PDCP sequence number of the delivered packets.

The reception unit may receive, from said another network node, information on a format of the protocol data unit related to packet transmission, and the acquiring unit may extract, based on a sequence number data length of the protocol data unit related to packet transmission based on the information on the format as received, a sequence number from the protocol data unit related to packet transmission. As a result of this configuration, information on PDCP-Config is signaled, so that it is possible to extract a PDCP sequence number from packets.

The information on the format may be received through a control plane or a management plane. As a result of this configuration, information on PDCP-Config is signaled, so that it is possible to extract a PDCP sequence number from packets.

The reception unit may receive through another protocol a sequence number of the protocol data unit related to packet transmission. As a result of this configuration, information on PDCP-Config is expressly signaled, so that it is possible to acquire the latest sequence number of the delivered packets.

The protocol data unit related to packet transmission may be included in a protocol data unit of said another protocol. As a result of this configuration, information on PDCP-Config is expressly signaled, so that it is possible to acquire the latest sequence number of the delivered packets.

When the reception unit detects that notification of the sequence number of the protocol data unit related to packet transmission is not carried out through another protocol, the reception unit may receive information on the format of the protocol data unit related to packet transmission from said another network node, and the acquiring unit may extract a sequence number from the protocol data unit related to packet transmission based on sequence number data length of the protocol data unit related to packet transmission based on the information on the format that is received. As a result of this configuration, information on PDCP-Config is signaled when a PDCP sequence number is not expressly signaled. Thus, the network node can extract a PDCP sequence number from packets, and by obtaining the latest PDCP sequence number, can report information on delivery of packets.

<Supplementary Embodiments>

While embodiments of the invention have been described above, the disclosed inventions are not limited to the embodiments, but it could be understood by those skilled in the art that various modifications, corrections, alternatives, replacements, and the like can be made thereto. While specific numerical examples have been used to facilitate understanding of the invention, the numerical values are only an example and appropriate values may be used, unless otherwise specified. The sorting of articles in the above description is not essential to the invention, but details described in two or more articles may be combined for use if necessary, or details of a certain article may be applied to details described in another article (unless incompatible). The boundaries of the functional units or the processing units in the functional block diagrams cannot be said to correspond to boundaries of physical components. The operations of two or more functional units may be performed by a single physical component or the operation of a single functional unit may be performed by two or more physical components. The order of steps of the process procedure described in the present embodiment may be interchanged unless incompatible. For the sake of simplicity of the process description, the functional block diagrams have been used to describe the base station equipment and the user equipment. However, such devices may be implemented by hardware, software or a combination of hardware and software. Software operated by a processor included in a base station equipment according to the embodiment of the present invention and software operated by a processor included in a user equipment according to the embodiment of the present invention may be stored in random access memory (RAM), flash memory, read only memory (ROM), EPROM, EEPROM, a register, hard disk drive (HDD), a removable disk, CD-ROM, database, server, or any other appropriate storage medium.

Notification of information is not limited to the aspects/embodiments described in this specification, but may be performed using other methods. For example, the notification of information may be performed physical layer signaling (such as downlink control information (DCI) or uplink control information (UCI)), upper layer signaling (such as radio resource control (RRC) signal, medium access control (MAC) signaling, or broadcast information (master information block (MIB) and system information block (SIB))), other signals, or combinations thereof. The RRC signaling may be referred to as an RRC message and may be, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended.

The processing sequences, the sequences, the flowcharts and the like of the embodiment/examples described above in this specification may be changed in the order as long as they are not incompatible with each other. For example, in the method described in this specification, various steps as elements are described in an exemplary order and the method is not limited to the described order.

The certain operations described in the specification as being performed by a base station equipment may be performed by a upper node in some cases. In a network formed by one or more network nodes having a base station equipment, it is clear that various operations performed for connection with a user equipment could be performed by a base station equipment and/or a network node other than a base station equipment. In the above, although a case of using one network node other than a base station a base station eNB has been described as an example, a combination of a plurality other network nodes (e.g., MME and S-GW) may be used.

The aspects/embodiments described in this specification may be used alone, may be used in combination, or may be switched with implementation thereof.

The user equipment may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The base station equipment may be referred to as an NodeB (NB), evolved NodeB (eNB), next generation NodeB (NR nodeB (gNB)), a base station or some other appropriate terms by those skilled in the art.

The terms "determining (determining)" and "deciding (determining)" used in this specification may include various types of operations. For example, "determining" and "deciding" may include deeming that to perform judging, calculating, computing, processing, deriving, investigating, looking up (e.g., search in a table, a database, or another data structure), or ascertaining is to perform "determining" or "deciding". Furthermore, "determining" and "deciding" may include deeming that to perform receiving (e.g., reception of information), transmitting (e.g., transmission of information), input, output, or accessing (e.g., accessing data in memory) is to perform "determining" or "deciding". Furthermore, "determining" and "deciding" may include deeming that to perform resolving, selecting, choosing, establishing, or comparing is to perform "determining" or "deciding". Namely, "determining" and "deciding" may include deeming that some operation is to perform "determining" or "deciding".

An expression "based on" which is used in this specification does not refer to only "based on only," unless apparently described. In other words, the expression "based on" refers to both "based on only" and "based on at least."

So long as terms "include" and "including" and modifications thereof are used in this specification or the appended claims, the terms are intended to have a comprehensive meaning similar to a term "comprising." A term "or" which is used in this specification or the claims is intended not to mean an exclusive or.

In the entire disclosure, for example, when an article such as a, an, or the is added in translation into English, such an article refers to including the plural unless otherwise recognized from the context.

It should be noted that, in the embodiments of the present invention, the flow control unit 140 or the flow process unit 240 is an example of an acquiring unit. The PDCP protocol data unit is an example of a protocol data unit related to the packet transmission. The transmission unit 110 or the transmission unit 210 is an example of a notification unit. PDCP-Config is an example of information related to a format of the protocol data unit related to the packet transmission.

Although the present invention is described above in detail, it is obvious to those skilled in the art that the present invention is not limited to the embodiments described in this specification. The present invention can be implemented as modifications and alterations without departing from the gist and scope of the present invention defined in claims set forth below. Accordingly, the description of this specification is intended to be exemplary and does not have any restrictive meaning to the present invention.

DESCRIPTION OF REFERENCE NUMERALS

100 CU
110 Transmission Unit
120 Reception unit
130 Configuration Information Management Unit
140 Flow Control Unit
200 DU
210 Transmission Unit
220 Reception Unit
230 Configuration Information Management Unit
240 Flow Processing Unit
300 UE
310 Transmission Unit
320 Reception Unit
330 Configuration Information Management Unit
340 Packet Control Unit
1001 Processor
1002 Storage device
1003 Auxiliary storage device
1004 Communication Device
1005 Input Device
1006 Output Device

The invention claimed is:

1. A first base station in a wireless communication system comprising a terminal and a plurality of base stations, the first base station comprising:
 a receiver configured to:
  receive, from a second base station through a control plane or a management plane, information for a packet data convergence protocol (PDCP) operation, the information related to a format including a bit size of information representing a sequence number of a protocol data unit related to packet transmission, and
  receive the protocol data unit from the terminal; and
 a processor configured to acquire the sequence number from the protocol data unit based on the length information indicating the bit size of the information representing the sequence number of the protocol data unit,
 wherein the bit size of the information representing the sequence number of the protocol data unit is based on the format and is 12 bits or 18 bits.

2. A communication method executed by a first base station in a wireless communication system including a terminal and a plurality of base stations, the method comprising:
 receiving, from a second base station through a control plane or a management plane, information for a packet data convergence protocol (PDCP) operation, the information related to a format including a bit size of information representing a sequence number of a protocol data unit related to packet transmission, and receiving the protocol data unit from the terminal; and
 acquiring the sequence number from the protocol data unit based on the length information indicating the bit size of the information representing the sequence number of the protocol data unit, wherein the bit size of the information representing the sequence number of the protocol data unit is based on the format and is 12 bits or 18 bits.

\* \* \* \* \*